No. 68,025. PATENTED AUG. 20, 1867.
R. W. YOUNG.
LIQUID METER.
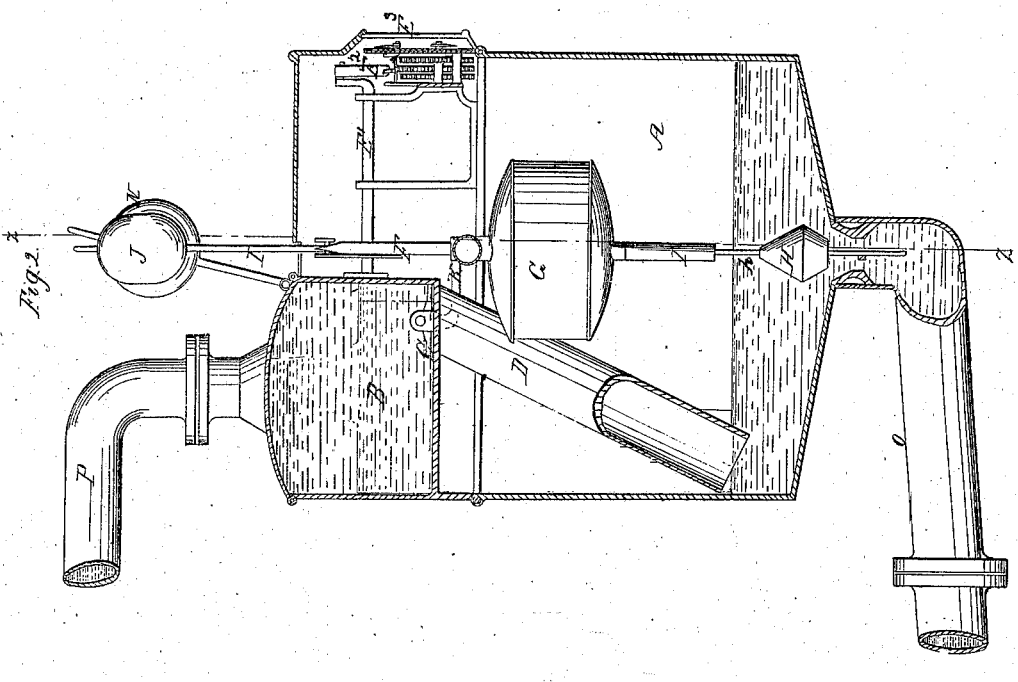
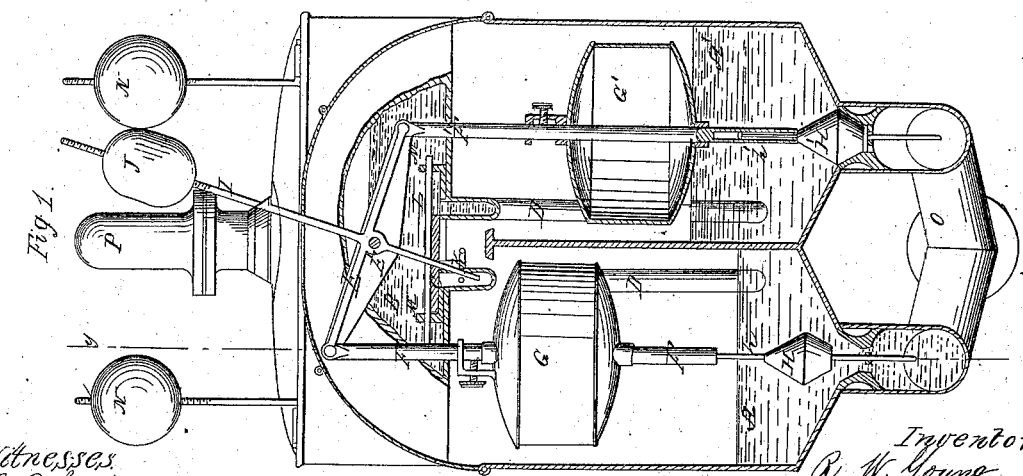
Witnesses
O. D. Smith
J. E. M. Bowen
Inventor
R. W. Young
By Munn & Co
Attorney

United States Patent Office.

R. W. YOUNG, OF RICHMOND, VIRGINIA.

Letters Patent No. 68,025, dated August 20, 1867.

IMPROVEMENT IN LIQUID-METERS.

The Schedule referred to in these Letters Patent and making part of the same.

TO ALL WHOM IT MAY CONCERN:

Be it known that I, R. W. YOUNG, of Richmond, in the county of Henrico, and State of Virginia, have invented a new and useful Apparatus for "Measuring and Weighing Liquids;" and I do hereby declare the following to be a full, clear, and exact description of the same, reference being had to the accompanying drawings, which are made a part of this specification, and in which—

Figure 1 is a vertical section of an apparatus illustrating my invention, the plane of section being represented by the line $x\, x$, fig. 2.

Figure 2 is a vertical section of the same on the line $y\, y$, fig. 1.

In the different figures corresponding parts are indicated by the same letters of reference.

The object of this invention is to provide a novel apparatus for measuring liquids, which is designed to be employed in connection with a weighing apparatus in order to ascertain the exact amount of proof spirit contained in the liquor from the still. Having ascertained the quantity as well as the weight, the quality or strength of the liquid can be readily determined by a familiar comparative calculation.

The measurer has two chambers A A', of equal dimensions, surmounted by a receiving reservoir, B, in which is placed a slide-valve, C, which, by reciprocal action, alternately opens and closes the inlet pipes D D of the respective chambers A A'. Between the chambers is a poised beam, E, extending to the centre of each, and from the ends of which are suspended rods F F, passing through floats G G', which are adjustably secured thereon. The lower ends of these rods form sleeves to receive the stems $h\, h'$ of the conical valves H H' which guard the outlet openings of the chambers A A'. On the pivot $E^1$ of the poised beam E rises a perpendicular rod, I, having an adjustable weight, J, on its upper end, and extending down to operate a forked arm, K, which moves the slide-valve C in the receiving reservoir. The bent extremity of the pivot $E^1$ carries a pallet, $E^2$, which, being impelled by the oscillation of $E^1$, actuates the wheels $E^3$ of a register, which marks accurately the quantity of fluid which passes through the chambers A A'.

The floats being adjusted to measure a specific quantity, the operation of the measurer is as follows: Supposing the operating parts in the relative position, represented in fig. 1, the liquor is escaping from chamber A and replenishing chamber A'; the float G descending and the float G' ascending. This continues until the chamber A' has its full charge and A is depleted, upon which the valve H is closed by the contact of the descending rod F, and the valve H' is simultaneously opened by the contact of the shouldered head of its stem $h'$ with the closed stem of the sleeve of rod F. Simultaneously with this reversion in the position of the valves H H' the forked arm K receives an impulse from I, thereby shifting the slide-valve C, so as to shut off the supply from chamber A' and open communication between chambers A and reservoir B. The operation now proceeds as before, the liquor accumulating in A and discharging from A'. The valve C may be provided with a guide-rod, L, and guide-plates M M, for maintaining it in its operating position. The action of the rod I upon the forked arm K may be varied both as to time and force by shifting the weight J away from or toward the pivot of axis F. Adjustable elastic balls N N serve to limit the vibrating motion of the weight J and prevent jarring. The pipe P conducts the liquor from the still to the receiving reservoir B. The special use of the forked arm K, in connection with the rod I, is to economize the moving force of the weight J by avoiding frictional connection with the valve C until the weight reaches the position (a little beyond the vertical) in which it is capable of acting with the greatest effect, as to speed and force, in shifting the valve. It will be seen that while the lower extremity of the rod I is vibrating in the space between the forks of the arm K, the said rod is entirely independent of the valve C, which, for the time being, is in a state of rest; therefore the liquor in the receiving-chamber is not concerned in moving the valve, but merely raises the weight J to a point where the influence of gravity causes it to drop suddenly, its most effective force being thus exerted upon the valve C.

I have described an apparatus which in measuring admits of a continuous introduction and discharge of fluid, and which is cheap in construction and accurate in the performance of its functions.

Having described my invention, what I claim as new, and desire to secure by Letters Patent, is—

1. The weighted rod I and arm K, in combination with the valve C, beam E, and floats G G', substantially as and for the purposes set forth.

2. The connections $h\, h'$, between the valves H H' and float-rods F F', to actuate the former by the latter but permit independent motion.

R. W. YOUNG.

Witnesses:
WM. D. QUARLES,
T. D. NEAL, Jr.